United States Patent

[11] 3,549,112

| [72] | Inventor | Nicola Palmieri<br>Milan, Italy |
|---|---|---|
| [21] | Appl. No. | 684,832 |
| [22] | Filed | Nov. 21, 1967 |
| [45] | Patented | Dec. 22, 1970 |
| [73] | Assignee | Pirelli S.p.A.<br>Milan, Italy<br>a corporation of Italy |
| [32] | Priority | Dec. 20, 1966 |
| [33] | | Italy |
| [31] | | No. 31287/66 |

[54] ELECTRICAL CABLE INSTALLATION
6 Claims, 2 Drawing Figs.

[52] U.S. Cl. .................................................. 248/70,
138/108; 248/201
[51] Int. Cl. ..................................................... F16l 1/00,
H02g 9/00
[50] Field of Search ........................................... 248/65, 70,
49; 174/99; 138/108; 174/33

[56] References Cited
UNITED STATES PATENTS

| 1,097,273 | 5/1914 | Tyler .......................... | 248/68X |
| 1,091,942 | 3/1914 | Mather ....................... | 248/70X |
| 1,220,343 | 3/1917 | Kimball ...................... | 138/108X |
| 2,141,894 | 12/1938 | Alexanderson .............. | 174/99X |
| 680,150 | 7/1901 | Hultman ..................... | 339/111 |
| 2,553,747 | 5/1951 | Carr ............................ | 174/33 |
| 3,244,793 | 4/1966 | Main ........................... | 174/33 |

FOREIGN PATENTS

| 171,577 | 6/1952 | Austria ....................... | 248/49 |

*Primary Examiner*—Chancellor E. Harris
*Attorney*—Ward, McElhannon, Brooks & Fitzpatrick ABSTRACT: Electrical cables are laid in helical configuration by draping them over spaced supports so that they lay in a vertical plane and then displacing selected portions of the cable in directions perpendicular to the plane.

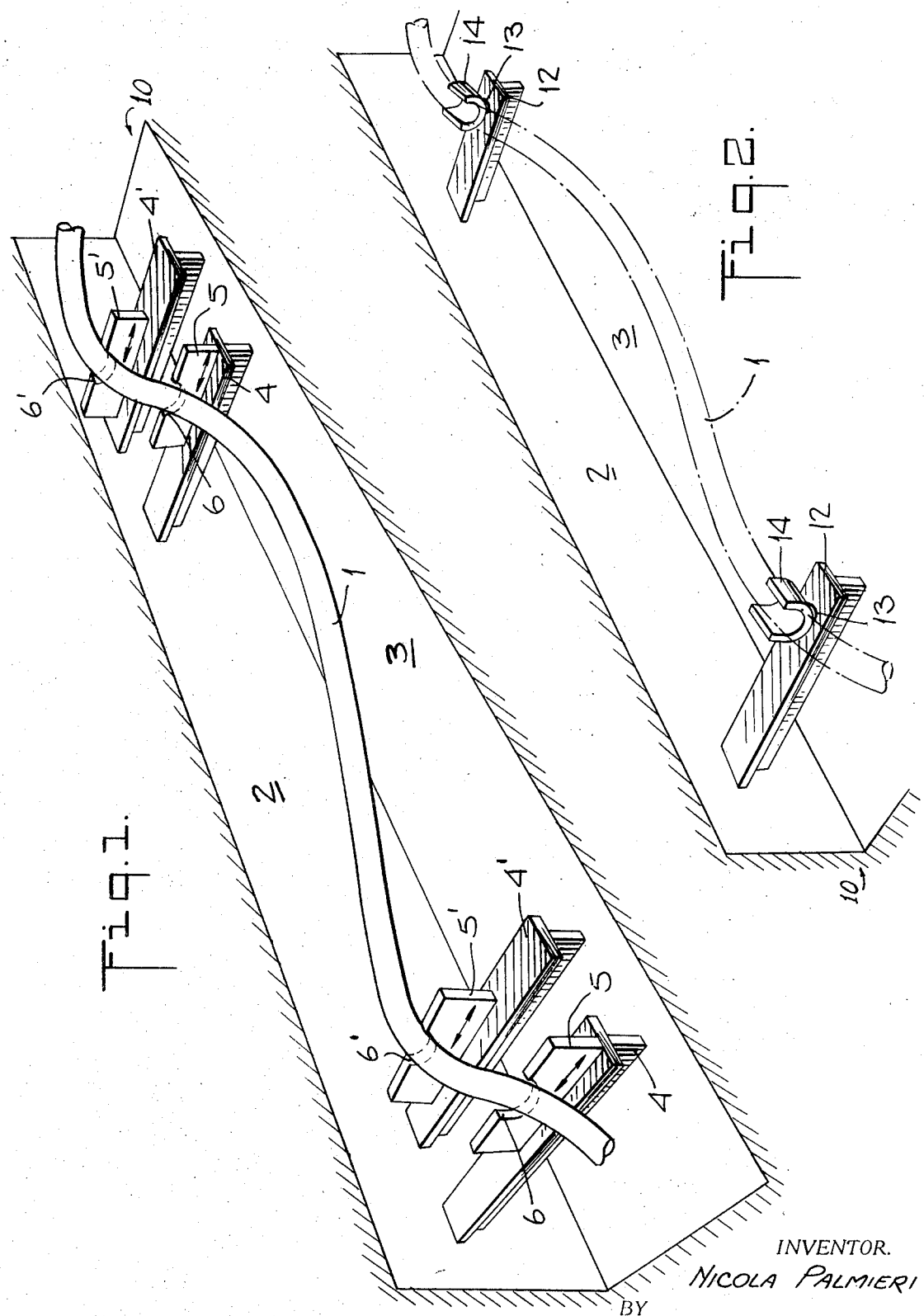

ELECTRICAL CABLE INSTALLATION

This invention relates to the laying of electrical cables, and more particularly it concerns the installation of cables in helical configuration.

The present invention is especially suited to the laying of lead-sheathed high current electric cables in underground ducts or in tunnels. In accordance with the invention such cables are laid in a helical configuration in order that the thermal expansions and contractions which occur during usage become uniformly distributed along the length of the cable.

During usage, the conductor of an electric cable becomes heated by the action of the current passing through it. This results from the so-called "Joule effect." As a result of this heating the cable tends to elongate longitudinally; and, as its ends are fixed, it must undergo a modification in its shape. When the cable is laid underground, such modifications are hindered by the restraining action of the surrounding earth; and consequently, any increase in conductor temperature results in the occurrence of mechanical stresses in the cable and of axial thrusts at its ends.

Occasionally cables are laid in underground ducts or tunnels in such a manner that they are draped over brackets. In such case, the shape of the cable is liable to vary in consequence of temperature variations. This gives rise to the formation of loops or coils which are likely to have bending radiuses smaller than a minimum allowable radius for cyclic deformation. In such case it becomes necessary to control in some way the shape which the cable may take.

One possible method for achieving this control would be to fasten the cable at short intervals (e.g. about 20 inches). In this way, however, a situation analogous to that of an underground cable would be created, with the consequent occurrence of internal stresses and thrusts at the cable ends.

An alternate, more widely used method, involves the positioning of the cable in straightened configuration on support platforms and the guiding of the cable at regular intervals of about 10 feet. In this way the cable is free both to elongate and to form loops when subjected to thermal variations.

The shape taken by a cable under heat laid according to this method is undulate. However, the undulations have no regular path. This is due to the friction between the cable and the support platforms on which it leans. Therefore, when the cable is subjected to higher temperatures, some cable sections will be nearly rectilinear, while other sections will have very severe loops.

These loops constitute weak points in the cable since the accompanying deformation of the lead sheath covering the cable is considerable. Moreover, the continuous flexing to which the lead sheath is subjected as a consequence of the daily temperature and load variations, may easily cause the sheath to break.

As an example, if the cable deformation reaches a value of 0.3 percent, a sheath made of common lead alloy may break after 1,000 cycles. Thus where one temperature cycle is undergone each day, the cable will fail after about 3 years of service. Actual tests have been conducted on cables suspended in this manner and these tests have shown that the cables do in fact fail after this relatively short time.

In order to eliminate this short service life, it has been proposed to impart to the cable a preliminary undulate shape and then to fasten it onto a support platform at intervals corresponding to one-half of the pitch of this preliminary undulation (e.g. about 10 feet). In this case the cable maintains its initial shape under high temperatures and only the amplitude of its previously imparted undulations is increased.

By means of this proposed method, it is possible to obtain a degree of improvement, since the deformations are more uniformly distributed along the line. However, it still happens that in each loop there is one point (namely midway between successive fastening points) where the cable sheath undergoes a maximum bending, while at the fastening points the cable experiences negligible bending. Thus the overall cable deformation is irregular.

The preformed undulate shape of the cable may also be produced by laying and securing the cable on brackets disposed at regular intervals and leaving the portions of the cable between the successive brackets hanging freely. However, in this case also there results a nonuniform distribution of the cable sheath deformation between the brackets.

A cable having a preformed undulate shape attains, under normal load conditions such as described above, a life of about 10 years. However, this is still insufficient to insure the service usually required for installations of this kind.

A satisfactory solution of the problem is obtained by laying the cable according to a cylindrical helix of very large pitch. It is in fact known that a helix has a bending radius which is constant at every point. Therefore, a helically disposed cable, which elongates on account of temperature, increases in overall length but maintains its shape unvaried, so that deformation occurs uniformly over the whole length of the cable.

Actually the bending radius of the cable remains uniform throughout the cable even though the helix radius itself changes with changes in temperature. In the laying of cables with a preformed helix, according to known techniques, as for example in the laying of pipe cables, the initial helical shape is obtained by previously shaping the cable by means of appropriate devices. The cable is then introduced into the pipe, which acts as its support.

The present invention provides an improved, simple and expeditious method, free of the above-described disadvantages, for helically laying cables in underground ducts or tunnels. The method of the present invention is characterized in that the helical configuration is obtained by first disposing the cable on a plurality of supports regularly spaced from one another along a laying line in the underground duct or tunnel. The cable is arranged to hang down between the successive supports so that it lies in a vertical plane passing through the laying line. The cable is then deviated at each support to extend at an angle from the laying line corresponding to the desired inclination angle of the helix.

The present invention, in one respect, involves a novel device for laying cables in accordance with the above-described method, characterized in that it comprises a plurality of supports disposed along the underground duct at regular intervals. Each support has associated therewith means able to deviate the cable, initially disposed in a vertical plane passing through the laying line, perpendicularly to the plane, until the cable reaches an angle corresponding to the desired inclination of the helix.

The expression "laying line" as used herein, means the line according to which the cable would be disposed if it were laid straight out along a rectilinear path.

According to a preferred embodiment, the means for deviating the cable are constituted by a pair of bearings arranged to slide back and forth in a direction perpendicular to the vertical plane passing through the laying line. These bearings are mounted to slide on the supports; and they are provided with suitable seatings for receiving the cable. The supports and the seatings are initially aligned in the direction of the laying line and are thereafter displaced with respect to one another in a direction perpendicular to the vertical plane in order to impart to the cable the desired helical configuration.

According to a further aspect of the invention, the means for imparting to the cable the desired helical configuration are constituted by a single bearing pivoted in the support and rotatable about a vertical axis. This bearing is provided with a suitable seat, having appropriate length and curvature, in which the cable is accommodated. The bearing is initially aligned in the laying direction and is then rotated from this direction through an angle equal to the angle of inclination to be established for the helix.

The supports are preferably in the form of brackets fixed to an intermediate portion of a wall of the underground duct and extending therefrom in a direction perpendicular to the laying line.

When the helical configuration is imparted to the cable in consequence of the mutual displacement of two adjacent bearings, each support is advantageously divided into two bracket-shaped parts, one for each bearing.

The seatings for receiving the cable are cavities formed in the surface of the bearings. These cavities may be open to provide simple cable support; or they may be closed and collar shaped with or without a rigid connection for the cable itself.

Various further and more specific objects, features and advantages of the invention will appear from the description given below, taken in connection with the accompanying drawings, illustrating by way of example preferred forms of the invention.

In the drawings:

FIG. 1 is a perspective view of a cable laying arrangement according to the present invention; and FIG. 2 is a perspective view similar to FIG. 1 but showing an alternate embodiment of the invention.

As shown in FIG. 1, there is provided a cable 1 extending along the length of a tunnel or duct 10. Within the tunnel or duct 10 there is provided a vertical wall 2 and a bottom floor 3.

The wall 2 bears brackets 4 and 4' on which slide bearings 5 and 5'. Seatings 6 and 6' are provided on each of the bearings 5 and 5'.

The seatings 6 and 6' have the shape of semicylindrical cavities, and thus provide a suitable support for the cable. As indicated above, they may be formed with closed collars, and they may be provided with or without a solid connection to the cable itself. Such arrangement serves to prevent the possible unseating of the cable should it be subjected to sudden stresses such as might occur as the result of a short circuit.

The bearings 5 and 5' are caused to slide on the brackets 4 and 4' by suitable guide means, not forming part of the present invention and not shown in the drawing.

As it can be seen from the drawings, the brackets 4 and 4' are arranged in pairs, spaced at regular intervals.

The disposition of the brackets 4 and 4' in pairs serves to impart to the cable, in the region of each pair, a curvature which is opposite to that in the region between the two brackets making up the adjacent pairs. The distance between the two brackets of each pair is established, within a reasonable tolerance, in accordance with the size of the cable to be laid.

The bearings 5 and 5' are initially disposed in such a way that all the seatings 6 and 6' are aligned in the laying direction. The cable 1 is then laid in rectilinear direction on the seatings. Care should be taken to leave equal amounts of cable slack between the successive pairs of brackets. The portions of cable which overlie each pair of brackets is thereby given a curvature the direction of which is opposite to that which the cable experiences in the slack regions.

At this point the two bearings 5 and 5' of each pair are relatively displaced to obtain the desired helical configuration of the cable 1. This relative displacement may be obtained by moving the bearing 5 with respect to the bearing 5', or vice versa, or by moving both bearings. In any case the displacement must be the same for each of the pairs of bearings. Moreover, the entity of the displacement should be such as to impart to the helix a desired inclination, which is established in accordance with its pitch and diameter.

By way of example, where the cable 1 has a diameter of about 2 inches, the pairs of brackets are disposed at intervals of about 10 feet, so that the pitch of the helix has this same value. The distance between the two brackets in each pair is about 32 inches; and the diameter of the helix, calculated with respect to the cable axis, is about 4 inches.

The laying operation according to the process of the present invention is very easy and convenient to carry out and it does not require the employment of skilled operators.

Also, it will be appreciated that the helical configuration thus obtained has a constant pitch. Since this pitch is preestablished in accordance with the distance of the pairs of brackets, it is maintained constant.

When the cable 1 is laid as above described, each change in temperature produces an equal elongation in each loop of the cable; and even through each loop is lengthened, the uniformity of the helix is not affected and therefore the cable deformation is uniform throughout.

By subjecting the cable to a thermal cyclic variation similar to that indicated in the previously described examples, the resulting flexing stresses which take place on the lead sheath of the cable is such that the cable life will exceed 30 years.

Turning now to FIG. 2, there is high-current alternate cable laying arrangement according to the present invention. As shown in FIG. 2, there are provided a succession of spaced supports 12 along the laying line. Each support 12 is provided with a single bearing 13 pivoted in the support about a vertical axis. The bearing 13 is provided with a suitable seat 14, having appropriate length and curvature, in which the cable 1 is accommodated. The bearings 13 are initially aligned along the laying line. However, after the cable 1 is draped over the bearings 13, they are then rotated about their axes through a prescribed angle equal to the angle of inclination to be established for the helix.

Although certain particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

I claim:

1. A method for helically laying flexible, high-current electric cables characterized in that the helical configuration is obtained by disposing the cable in a plane passing through a desired laying line, on a plurality of supports regularly spaced from one another in such a way as to leave a slack section thereof between successive supports lying in said plane, the normal length of the cable between corresponding and succeeding supports being greater than the distance between such latter supports, each of said supports comprising a pair of brackets spaced apart in the direction of the cable length a distance less than the distance between the supports, each bracket being movable transversely to said plane, said cable being disposed at each support on both said brackets, then deviating the cable, at each support, at an angle with respect to said plane by positioning at least one of said brackets in offset relation with respect to said plane, said angle corresponding to the desired inclination of the helix.

2. A flexible electric cable installation comprising a plurality of supports disposed at regular intervals along a plane passing through the laying line, each of said supports having movable seating means thereon receiving said cable and deviating said cable from said plane intermediate said supports, each of said seating means comprising pairs of bearings slidable on bearing surfaces of each support in a direction perpendicular to said plane and spaced apart in the direction of said line a distance less than the spacing between successive supports and each of said bearings being provided with a seating receiving the cable, said seatings being initially alignable in said vertical plane and being displaceable with respect to one another in a direction perpendicular to said plane in order to impart to the cable the desired deviation, said cable being of a normal length between the successive supports which is greater than the distance between such successive supports, and means holding the seatings in their displaced positions and hence, holding said cable at an angle to said plane at said supports which causes said cable to follow a helical path of the desired inclination.

3. A method for helically laying flexible, high-current electric cables having an inner conductor and an outer sheath separated from the inner conductor by insulation, characterized in that the helical configuration is obtained by disposing the cable in a plane passing through a desired laying line, with its sheath on a plurality of supports disposed substantially in said plane and regularly spaced from one another in such a way as to leave a slack section of said cable between successive supports lying in said plane, the normal unstretched length of the cable between corresponding and succeeding supports being greater than the distance between such latter supports, then deviating the cable, at each support, around an axis substantially parallel to said plane and transverse to the length of said cable to a position at an angle with respect to said plane and in which a portion of said cable intersects said plane at each support and the portions thereof intermediate said supports follow helical paths, said angle corresponding to the inclination of the helix.

4. A method according to claim 3 wherein each support comprises a bracket which is mounted in said vertical plane and which has a seating which is rotatable about an axis extending substantially perpendicular to the cable length and lying substantially in said plane and wherein said cable is disposed in the seatings of successive brackets and is thereafter deviated with respect to said vertical plane by rotating said seatings.

5. A flexible electric cable installation, said cable having an inner conductor and an outer sheath separated from the inner conductor by insulation and said installation comprising a plurality of supports disposed at regular intervals along a plane passing through the laying line, each of said supports having movable seating means thereon receiving the sheath of said cable and the length of said cable between successive supports being greater than the length of said intervals, each of said seating means having the seat thereof engaging the sheath displaced with respect to said plane around an axis at the support substantially parallel to said plane and transverse to the length of the cable so that said cable passes through said plane at each said support at an angle thereto and follows a helical path intermediate said supports.

6. A cable installation as in claim 5 wherein said seating means comprises a sheath receiving seat extending in the direction of the length of the cable and mounted on a single bearing pivoted in each support for rotation in said plane about an axis lying in said plane and perpendicular to the length of said cable, each seat being initially alignable in the direction of said laying line and being rotatable around said axis with the seat direction at an angle to said plane equal to the angle of inclination to be established for said helical path.